US008423759B2

(12) United States Patent
Moreau

(10) Patent No.: US 8,423,759 B2
(45) Date of Patent: Apr. 16, 2013

(54) METHOD OF BOOTSTRAPPING AN AUTHENTICATED DATA SESSION CONFIGURATION

(75) Inventor: Thierry Moreau, Montréal (CA)

(73) Assignee: CONNOTECH Experts-conseils, inc., Montréal (CA)

( * ) Notice: Subject to any disclaimer, the term of this patent is extended or adjusted under 35 U.S.C. 154(b) by 1100 days.

(21) Appl. No.: 12/378,144

(22) Filed: Feb. 12, 2009

(65) Prior Publication Data

US 2009/0210696 A1    Aug. 20, 2009

(30) Foreign Application Priority Data

Feb. 15, 2008   (CA) ..................................... 2621147

(51) Int. Cl.
*H04L 29/06*   (2006.01)
(52) U.S. Cl.
USPC .......................................... 713/151; 380/252
(58) Field of Classification Search .................. 713/151; 380/282
See application file for complete search history.

(56) References Cited

U.S. PATENT DOCUMENTS

| | | | |
|---|---|---|---|
| 4,771,461 A | 9/1988 | Matyas | |
| 5,784,463 A | 7/1998 | Chen | |
| 6,061,791 A | 5/2000 | Moreau | |
| 6,108,788 A | 8/2000 | Moses | |
| 6,763,459 B1 | 7/2004 | Corella | |
| 6,834,112 B1 | 12/2004 | Brickell | |
| 7,181,620 B1 | 2/2007 | Hur | |
| 7,587,045 B2 * | 9/2009 | Yeung et al. .................... 380/43 |
| 7,715,565 B2 * | 5/2010 | Kimmel et al. ................ 380/281 |
| 8,331,568 B2 * | 12/2012 | Ferguson ....................... 380/285 |
| 2005/0154889 A1 * | 7/2005 | Ashley et al. .................. 713/171 |
| 2006/0053483 A1 | 3/2006 | Beattie | |
| 2009/0126001 A1 * | 5/2009 | Krantz et al. .................. 726/10 |
| 2009/0310777 A1 | 12/2009 | Moreau | |
| 2010/0318784 A1 * | 12/2010 | Rao et al. ...................... 713/151 |

FOREIGN PATENT DOCUMENTS

| | | |
|---|---|---|
| CA | 2271178 A1 | 7/1999 |
| WO | WO/2005/069531 A1 | 7/2005 |

OTHER PUBLICATIONS

Frederic Dahm, Paul Ryan, Richard Schwartz, Amy Smith, and Dieter Stalder, "Security Considerations in Lotus Notes and Domino 7: Making Great Security Easier to Implement", Mar. 2006, IBM Redbook No. SG24-7256-00 Sections 3.1 and 7.3, Appendix C.
Wheeler, Anne & Lynn, "Two-factor Authentication Options?", Kerberos mailing list comment on Jul. 15, 2004, http://mailman.mit.edu/pipermail/kerberos/2004-July/005837.html.

(Continued)

*Primary Examiner* — Amare F Tabor

(57) ABSTRACT

An inventive method is disclosed for bootstrapping a trusted client public key at the server side in a client-server model of e-commerce or distributed computer applications. Generally, the invention integrates security technique elements and user procedural elements in such a way that no vulnerability arises due to the decoupling of elements. It is thus aimed at high security application areas. The readily available support of X.509 client security certificates in web browsers is advantageous for easy deployment at the client side. However, serious usability flaws deter the use of client certificates despite their potential for high security client authentication. The invention circumvents this contradiction at the client registration phase, and extends the benefits of simplified reliance on client public-private key pair to production use of the circumvention. Many variations of the inventive idea are disclosed, including the use of a dummy client security certificate that addresses the interoperability pitfalls of the X.509 technology while the trust in the client public key rests on other elements of the inventive method.

25 Claims, 4 Drawing Sheets

OTHER PUBLICATIONS

Dierks, T. and C. Allen, "The TLS Protocol Version 1.0", RFC 2246, Jan. 1999.

Dierks, T. and E. Rescorla, "The Transport Layer Security (TLS) Protocol Version 1.1", RFC 4346, Apr. 2006.

Ylonen, T. and C. Lonvick, Ed., "The Secure Shell (SSH) Protocol Architecture", RFC 4251, Jan. 2006.

Ylonen, T. and C. Lonvick, Ed., "The Secure Shell (SSH) Authentication Protocol", RFC 4252, Jan. 2006.

Ylonen, T. and C. Lonvick, Ed., "The Secure Shell (SSH) Transport Layer Protocol", RFC 4253, Jan. 2006.

Schaad, J., Kaliski, B., and R. Housley, "Additional Algorithms and Identifiers for RSA Cryptography for use in the Internet X.509 Public Key Infrastructure Certificate and Certificate Revocation List (CRL) Profile", RFC 4055, Jun. 2005.

ITU-T Recommendation X.273, "X.273 : Information technology—Open Systems Interconnection—Network layer security protocol", Jul. 1994.

ITU-T Recommendation X.274, "X.274 : Information technology—Telecommunication and information exchange between systems—Transport layer security protocol", Jul. 1994.

Dan Simon, Bernard Aboba, and Ryan Hurst, "The EAP TLS Authentication Protocol", IETF EMU Working Group, Jan. 9, 2008, draft-simon-emu-rfc2716bis-13.txt.

Dan Boneh, "Simplified OAEP for the RSA and Rabin functions", proceedings of Crypto '2001, LNCS 2139, Springer-Verlag, pp. 275-291, 2001.

Thierry Moreau, "PEKE, Probabilistic Encryption Key Exchange, 10 Years Later, Including the PEKEv1.25 Specifications", Cryptology ePrint Archive, http://eprint.iacr.org/2005/183, 2005.

The Apache Software Foundation, "Apache Module mod_ssl", excerpts from Apache HTTP Server Documentation Version 2.2, including: introduction, Environment Variables, and SSLOptions Directive.

Peter Gutmann, "Plug-and-Play PKI: A PKI your Mother can Use", 12th USENIX Security Symposium, 2003.

Peter Gutmann, "How to build a PKI that works", keynote address to 3rd Annual PKI R&D Workshop, Apr. 12-14, 2004, NIST, Gaithersburg MD.

Peter Gutmann, "X.509 Profile for Autonomous Certificates", Internet Draft draft-ietf-pkix-autonomous-certs.txt, Jun. 22, 1999.

* cited by examiner

METHOD OF BOOTSTRAPPING AN AUTHENTICATED DATA SESSION CONFIGURATION

FIELD OF THE INVENTION

The inventive method is in the field of information security protocols using cryptographic techniques, and the use of such protocols to establish trust in the identification of a remote party in data communications. It assumes a client and server model of network-enabled or distributed computer applications. The invention design is influenced by widely deployed software capabilities, notably the support of client security certificates in web browser software.

BACKGROUND OF THE INVENTION

Electronic commerce requires secure information security protocols to prevent fraud, e.g. based on impersonation of electronic identification data. In a completely electronic situation, it remains challenging to genuinely authenticate the actual identity of a remote party in an interactive session or a transaction.

This is so even with public key cryptography using X.509 security certificates, because the essence of this prevailing scheme, known as PKI, is delegation of trust bootstrapping to a certification authority which may not be better equipped than the electronic commerce operator in the first place. Also, the installation of client-side security certificates is error-prone and inconvenient for the end-user. Such installation procedures are so complex, e.g. including a request to a certification authority and the receipt of a security certificate in the end-user computer system, that they often appear remotely related to the critical requirement for end-user protection of his private key, a requirement which too often in practice becomes a secondary issue. The present invention aims notably at providing an electronic commerce operator a secure shortcut to strong client authentication while allowing clients to use conventional web browser software for interaction with the electronic commerce servers.

A while ago, the present inventor invented SAKEM, Secret Authentication Key Establishment Method, disclosed in U.S. Pat. No. 6,061,791, Moreau, Thierry, "Initial Secret Key Establishment Including for Verification of Identity", issued on May 9, 2000, hereafter the SAKEM disclosure and included herein by reference. SAKEM is an improved client registration procedure envisioned for electronic commerce. The basic idea shared by SAKEM, a less elaborate registration procedure developed by V-One for VPN client registration (U.S. Pat. No. 5,784,463, Chen, James F., Wang, Jieh-Shan, "Token Distribution, and Dynamic Configuration of User Entitlement for an Application Level Security System and Method", issued on Jul. 21, 1998 assigned to V-One Corporation), hereafter the V-One disclosure, and other schemes referenced in the SAKEM disclosure, is the establishment of a long-term symmetric key using public key cryptography at the establishment phase, with more or less elaborate provisions for client authentication. Nowadays however, authenticated symmetric secret key usage seems limited to VPNs, e.g. with IPsec VPNs. The leading SSL and TLS software implementations offer no or limited support of the symmetric key variant of the leading Internet security protocol, i.e. TLS-PSK for Transport Layer Security with Pre-Shared Key.

Thus, the abovementioned client registration procedures bootstrap a type of key material which is of little use with the security techniques implemented in prevailing web browser software. On the other hand, the client security certificate capability found in browser software is seldom used, leaving the bulk of electronic commerce security to password-based client authentication.

In situations where an electronic commerce operator needs stronger authentication, client security certificate, perhaps implemented in physical security tokens instead of a software-only solution, is the most readily available option. Actually, it is not the certificate management capability that is securing electronic commerce, but the client computer system potential for preserving the client private key secrecy. The trust in the corresponding client public key may be based on security certificates as consistently taught by the prior art. Other options are desirable, preferably with seamless integration in existing software.

BRIEF SUMMARY OF THE INVENTION

In its simplest description, the present invention is made of an electronic registration phase, a registration validation phase, and then the use, by production server entities for client entity authentication purposes, of a client public key in TLS-type data sessions. As a further description refinement, the invention provides an improved arrangement and refinements of IT security techniques, notably 1) a registration procedure, examples of which can be found in the prior art, 2) the provisioning of client private keys for TLS-type data sessions, 3) the use of TLS-type data sessions.

The registration phases are based on prior art procedures for registration of new clients in server-based secured electronic services. A suitable registration procedure is a specifications-based use of public key cryptography characterized by the server entity having a public key for new client entity registration purposes, the client role in the electronic registration phase being the selection and public key encryption of a symmetric secret key, the server role in the electronic registration phase being the public key decryption and recording of the symmetric secret key, and some form of verification of identification data for the client entity. Upon successful completion of the registration procedure, the server entity obtained a reasonable base for to trust the symmetric secret key as being shared with the client entity. An insecure network allows data transmission between the distant client and server entities; the rules of the registration procedure may specify one or more data transmissions with a minimum of one transmission from the client entity to the server entity. Within these limits, there can many variations of registration procedures suitable for the present invention.

The terms "public key encryption" and "public key decryption" in the above paragraph will be easily understood to encompass a broad range of key establishment schemes, sharing the capability to securely establish a symmetric secret key, or shared secret, starting from the server entity public key and the procedural compliance by the client entity and server entity. A common characteristic is that the server uses the private counterpart to its public key for to recover the symmetric key established with the client while eavesdroppers are unable to do so. Both the V-One disclosure and the SAKEM disclosure teach some of the possible variations of the basic idea. In any registration procedures suitable to the present invention, at one point in the more or less elaborate registration protocol, a registration cryptogram generated by the client entity using a public key cryptography primitive allows the server entity to recover the symmetric secret key with protection against passive eavesdropper at least.

Some of the registration procedure variations may require more than a single transmission, e.g. the present inventor PEKE scheme optional first message, but the general idea remains, as disclosed in Thierry Moreau, "PEKE, Probabilistic Encryption Key Exchange, 10 Years Later, Including the PEKEv1.25 Specifications", Cryptology ePrint Archive, http://eprint.iacr.org/2005/183, 2005. Indeed, a client computer software module which establishes connectivity with a server to send a registration cryptogram may quite easily, and transparently to the user understanding of what's going on, send and receive a few messages, for e.g. replay prevention nonces. In the case of a very high security requirement, the registration cryptogram preparation may be carried off-line and the transmission to the server may be of the store-and-forward type. Thus some variations that protect against client random source vulnerabilities are unavailable, but the high security environment is expected to provide a secure secret random source anyway.

The V-One disclosure leaves implicit the need for operator-assisted verification of client identification data. Indeed, without operator-assisted verification of client identification data, the V-One client registration process might be open to anyone, at least in contexts where there is no a-priori shared secret between the client and the server. It is not enough to assert that John Doe is entitled to register in the system, it is also needed to catch a registration instance for John Doe that would manifestly be an impersonation attack. Accordingly, in the V-One disclosure, operator-assisted verifications are certainly desirable.

In contrast to V-One, the SAKEM disclosure makes operator-assisted verifications very explicit and adds out-of-band assertions of identification data by a client entity agent, plus a "pass reply" feature that binds the out-of-band assertions to the symmetric secret key.

The human operator participation to verification of identification data may occur before identification data is supplied by a client entity agent. This takes the form of scheduled preparation for registration activities. A time window is assigned to each client entity for registration. A single registration instance occurring within the time window would be accepted temporarily, and confirmed later if no other registration instance occurred. This is operator-assisted validation in advance for a registration instance referred to by client entity identification data. This was disclosed early in U.S. Pat. No. 4,771,461, Matyas, Stephen M., "Initialization of Cryptographic Variables in an EFT/POS Network with a Large Number of Terminals", issued on Sep. 13, 1988. This Matyas disclosure explains, as a variation of the timer-based scheme, the establishment of a symmetric secret key with public key encryption using a server public key.

The distinction between operator-assisted validation of registration and fully automated lies in the presence of an operator decision about individual registration instances. Example of fully automated registration campaigns include validation of identification data by querying an existing database (e.g. account holders of savings accounts in a financial institution) or a credit rating service.

Out-of-band assertions of client entity identification data is separate from operator-assisted verification: in SAKEM, they are combined, but this need not be the case. Of relevance is the U.S. patent application Ser. No. 11/214,999, Beattie, Douglas D.; Creighton, Neal Lewis J R.; Bailey, Christopher T. M.; Remy, David L.; and Hamandi, Hani, "Methods and systems for automated authentication, processing and issuance of digital certificates", publication number US 2006-0053483 A1, published on Mar. 9, 2006. In this disclosed registration scheme, out-of-band assertions (in the form of a recorded voice when a client entity answers questions in an automated telephone interview) are recorded by the service provider but not necessarily used as an operator decision input. This may look like a fraud deterrent mechanism, but it foremostly protects the service provider: it becomes harder for a subscriber so registered to deny accountability for some questioned use of the rights granted by the registration.

The present invention requires validation of client entity identification data. It allows operator-assisted validation of client entity identification data. It allows out-of-band assertions of client entity identification data. It allows the SAKEM "pass reply" feature along the out-of-band assertion of client identification data.

For the transmission of client entity identification data to the server entity, the V-One disclosure relies on the electronic registration phase, and the SAKEM disclosure offers the flexibility among either the electronic registration phase or the context of out-of-band assertions of identification data. This invention uses a third mechanism, and leaves the former two as options. The third mechanism is a TLS-type data session to be explained later. Potentially, the supply of identification data to a service organization is sensitive, if not altogether unwise from a security perspective. In this respect, a growing challenge for e-commerce operations if the conflicting requirements of privacy protection (preventing theft of identify by restricting the circulation of personal identification) and the service provider need to positively identify new customers. This challenge is compounded by the limited effectiveness of web site SSL certificates for authentication of service providers. The present invention is an improvement over the prior art.

In the present invention, the symmetric secret key (established with the registration procedure) is used for a proof of possession for a client private key. The relationship between a client entity private key and its counterpart, i.e. the client entity public key used by server entities, is well understood in the field of public key cryptography. The present invention exploits the bare relationship between client entity private and public key counterparts, and somehow challenges the prevailing use of X.509 security certificates as trust evidencing records or cryptograms.

In technical terms of public key cryptography, a proof of possession cryptogram is a cryptogram that binds a public key and a symmetric secret key. The knowledge of both the private key and the symmetric key is needed to generate this cryptogram. The knowledge of the public key and the symmetric key allows verification that the cryptogram was produced by an entity that knew both the private and symmetric keys when the cryptogram was prepared. A straightforward embodiment of a proof of possession is a digital signature of a one-way transform (e.g. SHA fingerprint) of at least a portion of the symmetric secret key. It could also be the digital signature of the current time value encrypted with the symmetric secret key. It could also be the MAC (symmetric key cryptography Message Authentication Code) of a decrypted challenge previously encrypted by the server using the client public key. In the latter case, as should be obvious to someone knowledgeable of the field, more messages need to be exchanged between the client and the server: the server needs the client public key to compute the challenge and the client needs the challenge to compute the proof of possession cryptogram. At the cost of more messages, the server gets a proof of timeliness.

Because the symmetric key is used only for proof of possession as explained elsewhere in the present disclosure, it is possible to envision an embodiment in which the registration procedure would directly ascertain the private key possession, i.e. without the symmetric key as an intermediate value. Such a variation would not depart from the spirit of the present invention. However, even if prior art number-theoretic contributions suggested arrangements of cryptographic primitives for such direct proof of possession, the usual wisdom in applied cryptography suggests the reliance on better-studied independent primitives for key establishment (registration procedure) and digital signatures (proof of possession), see notably RFC3447 for the interface between number-theoretic contributions and selection of algorithm variants in standards-based protocols.

Up to this point in the summary of the invention, the references to data communications between the client entity and the server entity meant insecure network transmission between distant client and server entities. As soon as the client entity has the private key (of which the public counterpart will be used in the electronic registration phase), it may attempt TLS-type data sessions to connect to the server entity. This departs from the prior art where the client also needs a genuine security certificate before attempting TLS-type data sessions.

As its name suggests, the concept of TLS-type data session encompasses TLS (RFC2246, RFC4346) and earlier versions called SSL, but also the still-born ISO OSI NLSP (ITU-T recommendation X.273, Network Layer Security Protocol, 1994) or TLSP (ITU-T recommendation X.274, Transport Layer Security Protocol, 1994) in their connection-oriented variants. See e.g. recommendation X.273 annex C for an explanation of the use of security certificates in these early TLS-type protocol specifications. Also, the reuse of standardized security protocols expands the family of TLS-type protocols, as exemplified in the case of IPSEC by the Internet draft titled "The EAP TLS Authentication Protocol" (currently recorded in Internet draft repositories as draft-simon-emu-rfc2716bis-13.txt). Also in the TLS-type protocol family, the SSH protocol (RFC4251, RFC4252, and RFC4253) uses client public keys like those embedded in the X.509 security certificates, but, unlike TLS and earlier versions of SSL, allows the use of bare client public keys (i.e. not embedded in certificates) like suggested by the present invention disclosure.

Generally, the TLS-type protocols include protocol parameter negotiations and a wide range of possible configurations, of which a subset is applicable to the present invention.

Although not essential, server entity authentication is desirable, i.e. with a security certificate issued by a certification authority recognized by the client entity as is well known in the practice of SSL connections to web servers. Server entity authentication is not essential because the present invention is primarily concerned with trust in client entity authentication from the server perspective with the client public key as the primary foundation of trust (in practice, server entity authentication may be required for interoperability purposes). In other words, the present invention does not directly improve the practical limitations of server authentication with the typical end-user willingness to click "OK" when a browser software reports a server certificate validation failure. (The present invention indirectly improves the situation, as a consequence of overall secure application arrangement, because client authentication is based on the client entity private key usage instead of a password and the legitimate user would typically not provide sensitive data until she sees application data that can only come through a secure connection to the legitimate server.)

The invention relies on the usual session key derivation, almost invariably done starting with a Diffie-Hellman cryptographic primitive, leading to data encryption and data integrity protection in the data transfer phase of the session. These protection mechanisms are well understood. For instance, if identification data is sent using a TLS-type data session instance, confidentiality protection is provided by encryption. Some uses of TL-type protocols provide data integrity protection without encryption.

More specific to the present invention is the required use of a client entity private key combined with the non-use of a client security certificate for authentication purposes. This protocol configuration, as such, does not seem available in compliant implementations of many standards-based TLS-type protocols, e.g. RFC4346 TLS. In the preferred embodiment, a close substitute is achieved by the use of a "dummy" client entity security certificate that can be "issued" by the client entity itself because the private key of a "dummy CA" is openly distributed to client entities. This and other embodiments of "non-use of a client security certificate for authentication purposes" are described in further detail hereafter.

A TLS-type data session implementation is made of networking software, network interfaces, and their configuration, usually under the control of a system administrator, i.e. the natural person performing the tasks of configuring the system, troubleshooting problems reported by end-users, and the like. Sometimes, the system administrator function is not clearly assigned to a given person or employees of an organizational unit. When applied to connection-oriented protocols usually located at the network or transport layer like TLS-type protocols, the term "protocol engine" refers to the set of logic functions required to implement a working protocol specifications. Competent system administrators in charge of server systems with security protocol implementations know that protocol parameter negotiation may quietly downgrade the security of a data session instance if the server system configuration is too liberal in the set of acceptable parameter values (e.g. the set of ciphersuites allowed by a SSL/TLS server). The same idea applies to the present disclosure, so that server system configurations should be such that a client entity may not connect to a server entity through a TLS-type data session instance without using the client entity private key for a digital signature of session key material so that the client public key is a potential base for client entity authentication at the server end, as will be understood from the details of the TLS-type protocol configuration in use.

A "TLS-type data session instance" refers to a single run of the protocol, starting with a connection phase, followed by a data transfer phase, and then a connection termination phase. Because of the connection orientation of the TLS-type protocols, a given TLS-type data session instance may last from a fraction of a second (e.g. for a file transfer) to a few days or longer.

For the disclosure of the invention, it is necessary to distinguish protocol parameter negotiations from authentication in the context of TLS-type data sessions. Protocol parameter negotiation occurs during the connection phase of a TLS-type data session instance (re-negotiation may also occur during the data transfer phase). The purpose of protocol parameter negotiation is interoperability, i.e. to reach a state where the two communicating entity implementations use a compatible set of protocol options and adjustments, and the data transfer phase can work (or continue to work in the case of re-negotiation).

The abstract purpose of authentication is to trustworthily identify the remote communicating entity and to ascertain that it is allowed to connect to the local communicating entity.

Despite the abstract aspect of authentication purpose, authentication mechanisms in TLS-type protocol implementations and TLS-type data session instances are quite factual and definite. Authentication in TLS-type protocols relies on cryptographic techniques, primarily digital signatures and symmetric key MAC, and includes refinements such as timeliness checks to prevent replay attacks of digital signatures. Implementation-wise, authentication occurs normally within the protocol parameter negotiation, but remains a definite and identifiable feature of the TLS-type protocol implementation and TLS-type data session instance. Authentication features (in protocol implementations) and signals (in data session instances) foremostly show up as connection rejection or termination in circumstances where the parameter negotiation would succeed if the authentication function was not present, or disabled by configuration, user choice, or software modification.

A leading web server software package by the name of Apache has a specific configuration parameter by the name of SSLVerifyClientDirective which may be set to "optional_no_ca" for disabling security certificate verification when a web site is configured to accept https connections, i.e. web service secured by a TLS-type data session. Indeed, consistent with the prior art, this configuration setting is qualified "actually against the idea of authentication" in the configuration manual (Apache Software Foundation, "Apache Module mod_ssl", retrieved at http://httpd.apache.org/docs/2.0/mod/mod_ssl.html in February 2008). This setting would nonetheless achieve the required non-use of client security certificate for authentication purpose (with this type of non-mainstream adjustments of web server configuration, some systematic testing is desirable). Nonetheless, it allows the client entity to use its private key in the TLS-type data session instance. And it would not prevent the inventive method from using the client entity public key as a basis for authentication, e.g. when client entity authentication is implemented with an HTTP server script procedure.

For illustration of what is authentication versus unrelated TLS-type protocol parameter negotiation using the TLS specification document RFC2246 or RFC4346, the following error alert codes are clearly indicative of authentication failure: bad_certificate, unsupported_certificate, certificate_revoked, certificate_expired, certificate_unknown, unknown_ca, and access_denied. Some other error alert codes are related to cryptographic processing but not explicitly related to authentication: bad_record_mac, decryption_failed, handshake_failure, export_restriction, protocol_version, and insufficient_security. Some other error alert codes are not related to cryptography: unexpected_message, record_overflow, decompression_failure, illegal_parameter, decode_error, internal_error, and no_renegotiation. When looking at a TLS protocol software implementation logic flow, the locations where these respective error alert codes are generated would be indicative of the authentication features versus general cryptographic processing (e.g. negotiation of ciphersuites) or versus general protocol handling. Signals in a TLS-type data session instance can be investigated with packet sniffer tools such as the "ethereal" utility or proxy engines, in which case the above error alert codes can be observed. Two remaining error alert codes (from RFC2246 or RFC4346), decrypt_error and user_canceled, are not readily classified as authentication or unrelated protocol parameter negotiation. This fact does not make the authentication feature of TLS-type data sessions less factual: other clues may assist the determination by someone familiar with secure networking software implementation. It is thus a straightforward assignment for such a person to take a TLS-type protocol software implementation in source code form and modify it to inhibit authentication based on client security certificates.

An authentication failure is a special case of a cryptographic data integrity failure. Sometimes a choice to ignore either type of failure is made by an application software component, or even the end-user. This characteristic also distinguishes authentication from interoperability-oriented integrity checks (e.g. CRCs and checksums) that are systematically handled (and hopefully recovered) by the networking software layers or the network interface hardware.

The present invention selectively inhibits TLS-type data session authentication using client security certificates. This seemingly incorrect use of a leading security protocol is done openly; users and system administrators may be trained with the understanding that client security certificates, if any, are dummies in the context of the present invention. The authentication inhibition renders client entity security certificates ineffective for their trust evidencing properties, and thus limited to a required formality for mere interoperability or protocol parameter negotiations.

Implementation-wise, the authentication inhibition can be achieved with the abovementioned Apache web server configuration, or a patch to the TLS-type protocol software implementation having the same result. In another variant of the implementation, a dummy client security certificate is used.

Such inhibition of TLS-type data session authentication pertains to client security certificates only. With the present invention, the client entity authentication is based on more server-specific knowledge of client entity public keys, not carrying the overhead of X.509 standards-based representation, e.g. with client entity public keys stored in a database. Correspondingly, the user and system administrator training may focus on the criticalness of client entity private key protection, which is too easily overlooked when a trainer attempts to teach the endless ramifications of the X.509 security certificate technology.

The client authentication based on more server-specific knowledge of client entity public keys requires proper software. In practice, the required software adjustments are not very complex in the case of open source software packages available for web servers and scripting languages. With the commonly used Apache web server, a features-rich implementation of the SSL and TLS protocol is available, plus a nice integration of the PHP scripting language. The server application software (i.e. the PHP source code) can be made aware of the client security certificate with the Apache configuration parameter "SSLOptions+StdEnvVars+ExportCertData" that gives access to the client certificate through the "CGI/SSI environment variable" named "SSL_CLIENT_CERT" and thus available in the PHP source code as "apache_getenv("SSL_CLIENT_CERT")." Extracting a subject public key from a client certificate is a straightforward ASN.1 parsing software operation. However, because PHP is not a programming language well suited to ASN.1 parsing, a separate executable utility programmed in C++ does the client public key extraction when supplied with the client security certificate. It is sufficient to keep the minimal information about the public key value specific to the client; for the RSA cryptosystem, this is the RSA modulus (the RSA public exponent may be dropped for the processing of client entity authentication data in the server application software). The SSL protocol implementation on the server system is deemed to report reliably the client security certificate in use for the session, hence the public key information is reliable even if the rest of the dummy certificate is worthless. Obviously, other software arrangements can achieve the same results, and perhaps avoiding the processing overhead of the X.509 client security certificate moving through a few programming interfaces.

The overall operation of the invention makes use of the registration procedure outcome which relied on one or more TLS-type data session instances for transmission of client entity identification data. In these early TLS-type data session instances, the client entity public key was a temporary basis for authentication, later confirmed by the successful completion of the registration procedure. A benefit of using a TLS-type data session instance as the transmission mechanism for client entity identification data is that the full flexibility of an interactive web session can be applied to data validation and user feedback.

A successful registration procedure (and also the proof of possession verification) concludes with a trusted client entity public key in the registration server systems, e.g. in a database, with a validity indication that records the successful completion of the registration procedure.

From then on, production use of the client entity private key may, benefiting from the efficiencies and security of client entity authentication using the client public key and the validity indication. The production use can be any of the conventional use of a trustworthy client entity key pair, broadly classified as digital signature or public key encryption. Public key certification may intervene between the registration completion and contemplated production use, this time with compliance to the PKI principles.

The foremost contemplated production use of the client entity key pair is client entity authentication in TLS-type data sessions. As is known in the art, the apparent magic of public key cryptography operates through a digital signature of session key material, and thus turns into a digital-signature-like function for the server (ascertaining the origin of the received data) and public key encryption for data sent to the server. The server entities involved in theses routine TLS-type data sessions can be any production server which has access to the registration server records of valid client public keys. Communications between systems at various server entities may occur using all sorts of techniques, such as private networks and VPNs, network file systems, remote procedure calls, socket API to remote databases, distributed databases, and the like.

The table below summarizes some contributions of TLS-type protocol elements for protocol purposes in the present invention with the prior art use of TLS protocol as a comparison basis.

From the user or client entity perspective, the purpose of the invention is to facilitate enrollment and use of high security computer applications. From the service operator perspective, the invention achieves this purpose by providing a sound base for trusted knowledge of client entity public keys. Stated differently, the invention provides a improved secure way of populating a client entity public key database.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWING

The drawing in FIG. 1 contains a schematic overall abstract view of a possible embodiment of the present inventive method.

The drawing in FIGS. 2 and 3 contain schematic abstract views of an entity participation in a possible embodiment of the inventive method for registration purposes, respectively the client entity in FIG. 2 and the registration server entity in FIG. 3.

Figure 4:
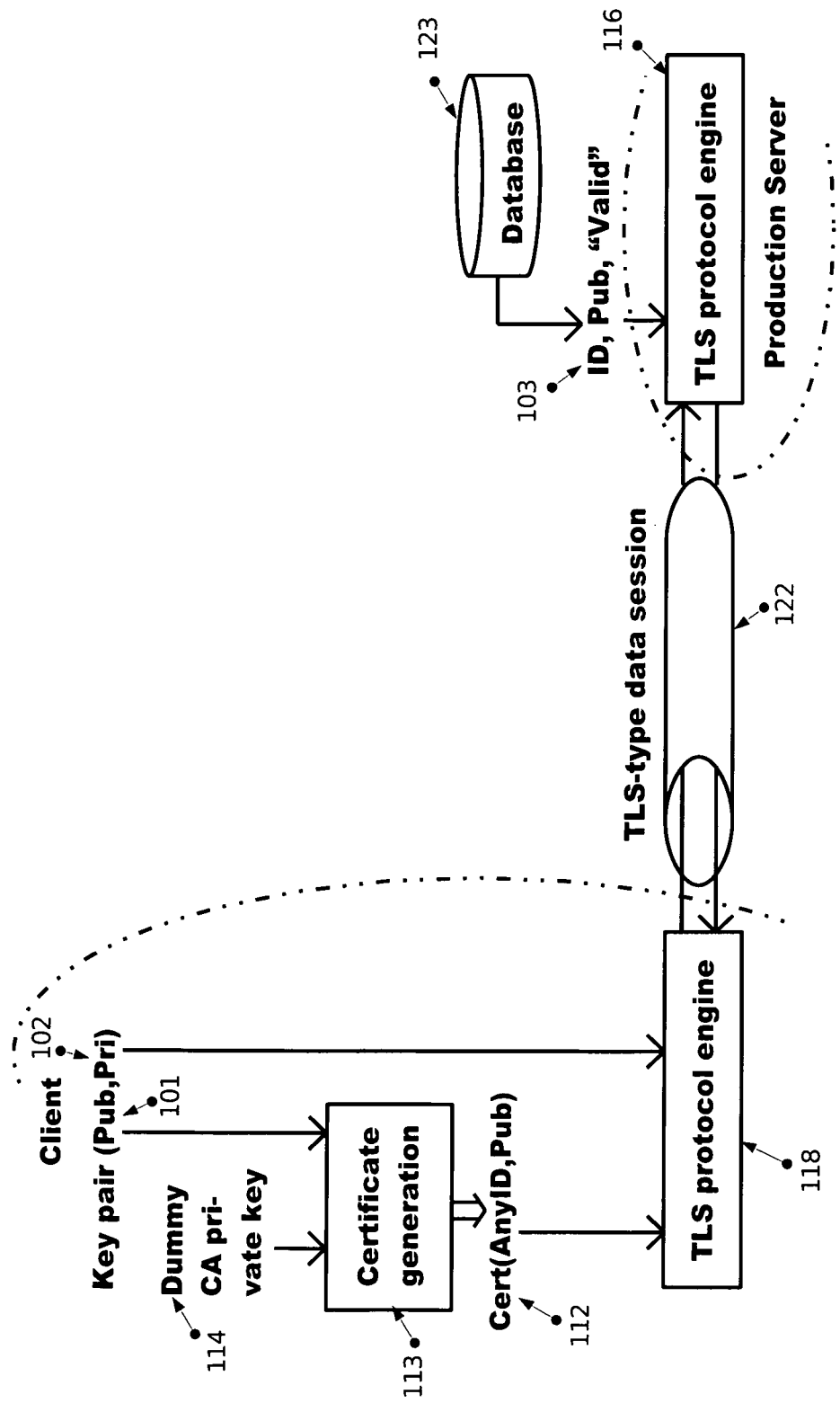

The drawing in FIG. 4 contains a schematic abstract view of a possible embodiment of the inventive method for the portion occurring after the initial client entity registration.

DETAILED DESCRIPTION OF THE INVENTION

In the present invention, a client entity is a computer system or another type of electronic equipment with data processing capabilities, under the usual control of a person, a family unit, or an organizational unit, and the like, such that personal information may be stored on the system or equipment with reasonable expectation of privacy. In electronic commerce, there is a form of amalgamation of system or equipment with the controlling entity, so the client entity also refers to the person, family unit, or organizational unit. The client entity system or equipment has permanent or occasional access to a network, e.g. the public Internet, through which it may reach server entities using common data communications protocols such as UDP, TCP, or X.25. The typical server entities are web servers operated by service organizations of all kinds that may come up with new ways of providing services electronically. Server entities may also be operated in proprietary networks that would reach a limited set of client entities. It often arises that a service provided electronically is complemented by a call center or other form

|  | Context | | |
|---|---|---|---|
|  | Prior Art Use of TLS Protocol | This Invention | |
|  | | Protocol element | |
| Protocol purpose | Genuine Client Security Certificate | Bare Client Entity Public Key | Dummy Client Security Certificate |
| Protocol Parameter Negotiation | Relied upon | | Relied upon only for formal protocol compliance |
| Temporary Authentication | n/a | Relied upon | |
| Authentication | Relied upon | Relied upon | | of interaction between the client entities and service organization representatives, also called operators. Thus, like a client entity, a server entity also implicitly refers to persons as well as systems and databases in computer rooms. In a well-designed electronic service, the specific operator handling a given client entity business should be close to the client entity, e.g. a bank clerk in the local branch for on-line banking or the employee manager's secretary for dental plan claim processing.

The steps of the inventive method do not necessarily occur in the same chronological order as their order of description. A given step may not begin before every input are available, and conversely the steps producing these outputs must be completed. In practice, this dependency logic is also constrained by other factors such as the limited availability of private key material (either protected by a local password and/or stored in a security token) and the simplification of user tasks by the grouping of procedural elements in a single software operation controlled by the user.

The inventive method allows a client entity to authenticate itself with the use of public key cryptography. Thus an essential step is to procure a client public key (101) having a private key counterpart (102) to the client entity. This is well known in the art. Key pair generation (109) and handling can be done in software or in a security token having public key cryptography capabilities. As disclosed herein, the inventive method allows production server entities to use a trustworthy copy of the client public key (103) in know uses, including for client authentication in TLS-type data session instances without the overhead of X.509 client security certificates issued by trusted certification authorities.

The procurement of the client entity key pair (101, 102) requires no relationship with any server entity. At the outset of the inventive method, the client entity has no trust relationship with a registration server entity (the server entity has no basis for authenticating this client in data communications). The method bootstraps this trust relationship with a registration procedure (104) in which a client entity interacts with a registration server entity to establish a symmetric secret key shown as SSK in the figures. At the end of the registration procedure, the client entity has a local copy of the symmetric secret key SSK (105) and the registration server entity also has its local copy of the symmetric secret key SSK (106).

Figure 1:
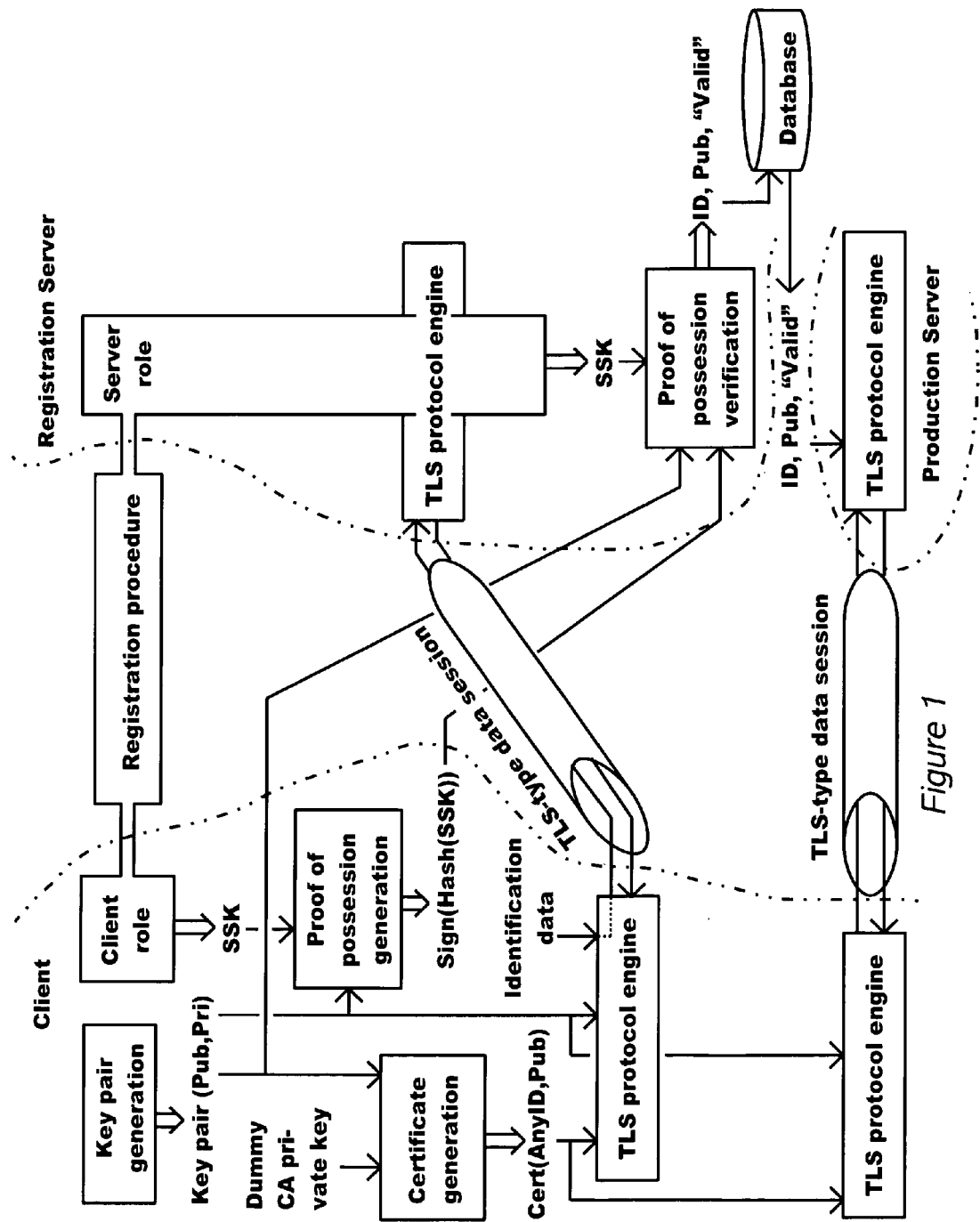
Figure 2:
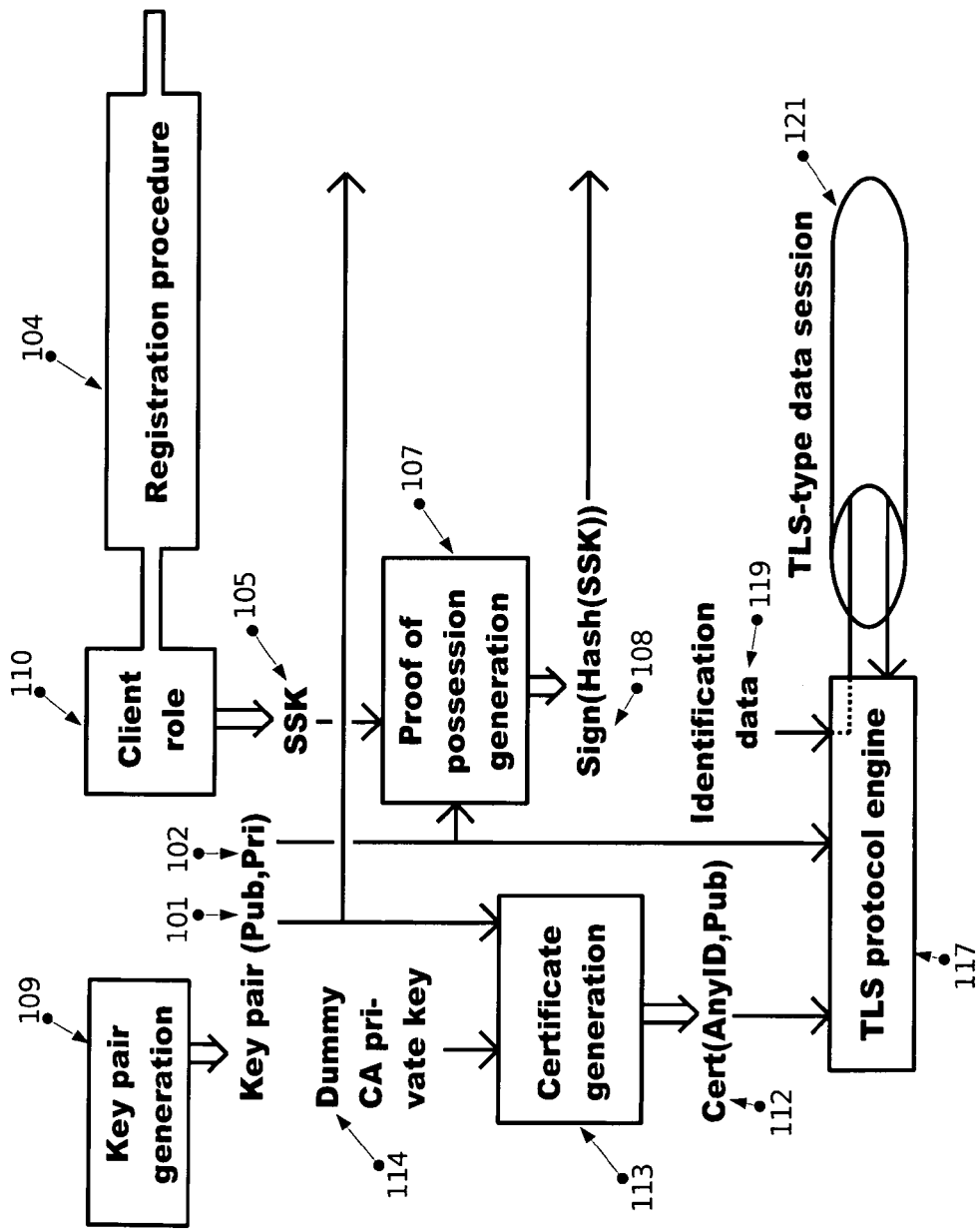

Preferably just after the generation of the registration cryptogram by client entity as part of its role (110) in the registration procedure, the client entity generates a second cryptogram, often called proof of possession, that binds the client public key and the symmetric secret key SSK. In the FIG. 2, this is shown as the proof of possession generation functional block (107) and the illustrated second cryptogram (108) is a digital signature of a one-way transform of at least a portion of the symmetric secret key. While this digital signature illustrates the inventive idea with a well-understood notation, the preferred embodiment relies on a RSA probabilistic signature scheme, in order to benefit from the advanced number-theoretic security proofs (a probabilistic signature protects from the known perils of signing meaningless data that an adversary might control). The preferred embodiment uses the digital signature specification RSASSA-PSS from RFC4055 with the default parameters, leaving aside the ASN.1 encoding and object identifier values. Likewise, a simplified specification by Ban Boneh may be used, as disclosed in Dan Boneh, "Simplified OAEP for the RSA and Rabin functions", proceedings of Crypto '2001, LNCS 2139, Springer-Verlag, pp. 275-291, 2001.

The inventive method includes the transmission from the client entity to the registration server entity of 1) the public key (101), 2) the registration cryptogram, and 3) the second cryptogram (108). These transmissions would normally occur in a single message, but may be in separate messages. In the case of separate messages, a registration reference number could assist the grouping of these three items at the server side for coherency of processing, but the cryptographic field values (SSK, client public key, proof of possession digital signature) and their validation is the ultimate message reconciliation mechanism. These transmission rely on an insecure network, but end-to-end security is provided by the registration procedure, and can be leveraged as follows. The registration procedure usually provides message format placeholders for additional data fields when the registration cryptogram is transmitted, with cryptographic data integrity protection and optional encryption. So it is convenient to put the public key (101) and the second cryptogram (108) in integrity protected additional data fields. Some of the additional data fields that are encrypted (in addition to integrity protection) can be used to transmit client entity identification data fields. This implements one of two optional mechanisms the supply of identification data for and by the client entity.

Some registration procedures work with transmission capabilities limited to store-and-forward, like the SAKEM procedure when using the PEKE cryptosystem without the PEKE first message. Other procedures require exchanges of messages in the two direction of transmission, in which case immediate network connectivity is required during the electronic registration phase by the client entity.

The software requirements for the inventive method steps described so far for the client entity are conveniently implemented in a single software utility for key pair generation (109), cryptogram preparation for the registration cryptogram, and proof of possession generation (107). The software utility would use the networking API (Application Programming Interface) provided by the local operating system if the registration procedure requires, or makes good use of, immediate network connectivity in the client role (110). In this case, the computerized portion of the client role in the registration procedure would be implemented in the software utility (the client role includes the decision to undertake the registration procedure, which is not computerized). The well-known cryptographic software library openssl comes with utility commands, e.g. for key pair generation, and can be used as an example or starting point.

In the embodiments where a dummy certificate (112) implements the non-use of client security certificate for client entity authentication by server entities, the inventive procedure also requires, as an early step, a dummy certificate preparation (113). An expeditious strategy is to use a dummy certification authority with an intentionally compromised public key (114). This strategy is intended to circumvent two deployment obstacles in the X.509 client security certificate technology, namely 1) the PKI key management principles that turns the trusted CA into an inescapable indirect participant in every e-commerce relationship, and 2) the interoperability minefield created by the X.509 security certificate features such as attributes, extensions, or identifiers. The first obstacle is addressed by using a breached signature key pair for a dummy CA.

A concrete example of a breached dummy CA private key (114) uses the two large prime numbers 12223765854511530769064115990504106362482595762 02372062268431831951889 05886812960989163067682746408290575551141211917 87424630650971878408733800761470052087 and 11481808643981977405895116018975918518368605263 9978623317618889122997 32662162482850576030071809594512796078977328354 96720301348896252892342069271045208808, with the public RSA exponent 65537.

The corresponding private key encoding using conventional rules is shown in the table below. This concrete example should be adequate for the practice of the invention without any of limitation in scope, expiration time, and the like. Likewise, publicly breached RSA private keys are available in some "snake oil" sample files distributed with the openssl cryptographic library or Apache web server. However, from a practical perspective, using these for the present invention might confuse security operation auditors and investigators because the present invention usage would be harder to distinguish from erroneous production use of snake oil sample files.

which the client certificate is issued without authentication formalities) may be needed in the RFC4346 TLS protocol parameter negotiation message called "certificate request." With the Apache web server, this is enabled through the configuration directives SSLCACertificateFile, SSLCACertificatePath, SSLCADNRequestFile, and SSLCADNRequestPath. This web server configuration requirement, or its equivalent for other variations and implementations of the TLS-type protocols, applies to the TLS protocol engine (115) at the registration server entity and any TLS protocol engine (116) at the production server entity.

```
-----BEGIN RSA PRIVATE KEY-----
MIICXQIBAAKBgQDH3cqnjWsH1/LFe5tf1n+d4hdGc/kCqc0IPOZV8qUrzFJjHe31
dAnSyIgOARpG5kKSfYiV6eniMY1xiNGJ3tOdjheYjws+00dTFiAUMt77CkqfZzTQ/
L257TiPN82eoFcbCg89/H2EtwdRdIeKCoWnavfijPsEoSNbChYftm9vVQIDAQAB
AoGAeZsOCcI2xA/1a4jYsYguH58HsFsxwBgWYxPCxbqcGrj3y8zTEwwmSfSvK24q
UccZ7E2rBCPNpU2nFNQ9QditAdWk/au8rdHkPCUuTdhWnz9v4aMbLKcqenq/NTnv
reT1bz15NkSQGdsogogM50xsndT+xxrgHPQPvMBh5bixLuUCQQDpZIXcSXroqgG6+
lOmigyRXDPHB1IEgBJcxhiNEQ7oIP+j5SrhH0SYTf4ECTTnuhGChsPyjtqAvIgd
3YwmdWb3AkEA2znpXh50X+ihnfOmWaYXF3yeLwtp1SkoVh9zyjILEGvAdaCcI18i
PUfOvw82PY+ggOoZO1pTBXB7G7z2v6PNEwJBAIxFGh6XGwOSiY+yu2uwNHV4kLXh
tG13+5E+jarawbbJflsmdGrwu+09kpkiX2WV8sgb7tBtAu20YapxaLYEgWkCQAFN+
OuMdtjTQ5LzDjxeVqjXHwHcqYaRNiI9Ea1UWuiAG6cXi5ZSTJvcv8IbTxFSt3vM
6NWHlhLkNndVyoodaW0CQQCmMnn5UOhQ6SvvXvPUUjDY1bcqs5S8WvZqPO+VUQoX
1Zjc7TkTkphjuTMO3dMahX2B++xn7TfX1u2nvGy90VEe
-----END RSA PRIVATE KEY-----
```

The second obstacle, X.509 interoperability, may be addressed by specifying an X.509 dummy CA self-signed security certificate, with a set of fields such as attributes, extensions or identifiers, plus another set of fields such as attributes, extensions or identifiers to be used for the generation of dummy client certificates. It should be easily understood that such a dummy certificate potentially certifies anything that looks like a public key with the conventional encoding rules. The certificate generation (113) may be done anywhere in the network, by any entity, at any time prior to the use of the certificate. It can also be repeated at will. It may be done in the same client software utility that does cryptogram preparation for the registration cryptogram, and proof of possession generation (107). It may also be done by an anonymous on-line service that blindly issues client certificates for anything that looks like a public key with the conventional encoding rules.

The generic requirement for the present invention embodiment is that the client entity gets a client security certificate chain (112) in which at least one signature uses a private key of which the signature capability is available without authentication formalities to the client entity. This covers cases where the above on-line service is operated by an "intermediate CA," which would provide the required client security certificates to overcome the X.509 interoperability obstacle.

It will be easily understood that the top-level CA (e.g. the dummy CA) at the end of the certificate chain (i.e. under A concrete example of a dummy CA self-signed certificate with the above breached RSA public key has been tried for a client certificate. Interoperability was successfully verified between the Apache web server version 2.2 and the browsers Firefox 1.5.0.3 and Netscape 7.1. This interoperability validation failed with the Konqueror browser version 3.5.1, but it is only a matter of patient troubleshooting since interoperability is unaffected by the fact that a public key has been compromised. There are many ways to report the details of the two certificates, e.g. by reference to the standard documents, as a listing of the actual contents, as commands to the certificate creation software utilities, or by reporting the assumed requirements of web server software and web client software. Since none of these can show the significant details in their context, a narrative description follows, with some terms taken as the short or long names of standardized ASN.1 object identifier values. Both certificates use the X.509 version 3 rules. The CA name, user name, and a few other descriptive fields has been set arbitrarily. For both the CA and the client, CN=US, ST=Florida, L=Lakeland. For the CA, the organization and common names are respectively "Dummy certification authority (CA)" and "Do not use unless you understand consequences". For the user, they are respectively "users" and "user". The certificate validity periods are 30 years for the CA and two days less for the user. The signature algorithm for the CA is sha1WithRSAEncryption. The X.509 version 3 extensions are indicated in the table below.

| X.509 version 3 extension | Value for certification authority certificate | Value for client certificate |
| --- | --- | --- |
| X509v3 Basic Constraints | CA: TRUE | CA: FALSE |
| X509v3 Key Usage | Digital Signature, Certificate Sign, CRL Sign | Digital Signature, Non Repudiation, Key Encipherment |
| X509v3 Extended Key Usage | TLS Web Client Authentication | TLS Web Client Authentication |

-continued

| X.509 version 3 extension | Value for certification authority certificate | Value for client certificate |
|---|---|---|
| Netscape Cert Type | SSL CA, S/MIME CA | SSL Client |
| Netscape Comment | | "Bizarrely Generated Certificate" |
| X509v3 Subject Key Identifier | B0:05:F3:B7:E4:34:9E:E6: B3:8A:85:80:A2:60:C6:56: 94:1C:6B:93 | -- value specific to each client entity public key -- |
| X509v3 Authority Key Identifier | keyid:B0:05:F3:B7:E4:34: 9E:E6:B3:8A:85:80:A2:60: C6:56:94:1C:6B:93 | keyid:B0:05:F3:B7:E4:34: 9E:E6:B3:8A:85:80:A2:60: C6:56:94:1C:6B:93 |

In the inventive method logic, once the required operations are completed at the client entity, the server has received the registration cryptogram, the client public key (101), and a cryptogram (108) that binds the client public key and the symmetric secret key SSK (105) to be recovered by the server as its local copy of SSK (106), and to be recognized as trustworthy if the registration server entity is able to verify the identification data for the client entity. At the client entity, the completion of the required operations covers most of the systems-oriented preparatory operations, but the supply of identification data is not complete.

The present invention may be practiced with wide variations in the validations applied to client entity identification data. Generally, a registration server entity should seek data freshly submitted, and which can be verified both with respect to the data source and data value. The inventive method uses one or more TLS-type data session instance (121) for submitting and accepting identification data. The data origin for this channel is ascertained by the cryptography in the temporary authentication for TLS-type data session instance. In the normal circumstances, such temporary validation will be retrospectively validated by the positive registration conclusion. As mentioned earlier, identification data may also be submitted and accepted in the additional encrypted data fields in the registration procedure (104). In this case, the data origin is ascertained to the extent possible according to the cryptographic processing in the registration procedure, and other features (e.g. the SAKEM "pass reply").

The invention allows optional out-of-band assertions of identification data. This category of communications channels is more cumbersome to the client entity, more labor-intensive for the registration server entity, but it has a more definite fraud prevention potential. Possible out-of-band channels for assertion of identification data include telephone conversation with a call operator agent, regular mail or courier service, a visit to a retail location or a registered professional office. E-mail might be considered, but its commonality of UDP/TCP connectivity reliance with the electronic mechanisms taints e-mail with an in-band characterization, and hence turns it into a superficial fraud prevention scheme. The origin of the out-of-band assertion of identification data may be ascertained according to the characteristics of the channel in use.

When the relevant client entity identification data is collected and verified at the server entity, the registration may be validated. Such validation applies to the symmetric secret key SSK (106), and immediately allows the synthesis of the validated client public key (103) if the proof of possession cryptogram (108) is found to be correct by the proof of possession verification logic (120). Typically, the validated client public key is stored in a database (123).

In the preferred embodiment, supply of identification data (119) through a TLS-type data session instance (121) takes the form of a secured web session where the client entity agent may enter identification data elements in an HTML form, and where this data entry updates a registration server entity database. In this context, the client entity agent is also invited to identify one or a few "introducers" in the service organization who would be in a position to positively confirm the client entity identification data. The preferred embodiment also requests an out-of-band contact between a client entity agent and a service entity operator, preferably with one of the suggested introducers. This supposes some type of RBAC (Role Based Access Control) scheme to help control who may be designated as an introducer, perhaps according to the type of service for which the registration is requested. The index value for the database uses the client entity public key value. There is thus no ambiguity for the reconciliation of a registration cryptogram, which is sent together with the public key (101) and proof of possession cryptogram (108), with the supply of identification data (119) in the web session.

In the preferred embodiment, the registration server operator (the introducer role), uses a production TLS-type data session instance secured according to the present invention to query and update the database where the client entity registration request is outstanding. In any case, such an interactive session by the introducer should occur when this person is informed of the out-of-band assertions of identification data by the client entity. It may also occur without such out-of-band assertions, e.g. if the introducer has some indirect knowledge allowing the grant of the registration request, from the client entity identification data supplied electronically. The outcome of this operator assisted verification of identification data is either the grant or rejection of the client entity registration.

The registration system at the registration server entity prevents the grant if the proof of possession cryptogram (108) can not be verified by the proof of possession verification logic (120) from the recovered copy of the symmetric secret key SSK (106). That is to say, affixing a validity indication to the client public key (101) to become the verified public key (103) at the registration server entity is contingent upon successful completion of the registration procedure server role (111) and the verifying of the cryptogram that binds the client public key and the symmetric secret key.

Once the client entity and the registration server entity completed the registration, production use of the client entity key pair (101, 102) may occur. This may take the form of data transmission between the client entity and a production server entity using a TLS-type data session instance (122) in which the client entity uses its private key counterpart (102), and where the client entity authentication uses verified client public key and the public key validity indication established at the registration server entity, i.e. the verified public key (103).

The same kind of secured session occurred between the client entity and the registration server entity for the supply of client entity identification data (119), except that at this occasion the client authentication was on a temporary basis. In such TLS-type data session (121), the client entity used its private key counterpart (102), and the public key received in-band of the TLS-type protocol was accepted on a tentative basis by the registration server entity, and recorded with a status code meaning "authentication pending validation."

It is thus a purpose of the present invention to provide a method of bootstrapping configuration for TLS-type data sessions comprising steps of: a) procuring a client public key having a private key counterpart, b) generating at the client entity a registration cryptogram according to a registration procedure to establish a symmetric secret key, and a second cryptogram that binds said client public key and said symmetric secret key, c) sending at least said client public key, said registration cryptogram, and said second cryptogram to a registration server entity, d) supplying from the client entity identification data elements for the client entity through at least one TLS-type data session instance connected to the registration server entity in which the client entity uses said private key counterpart, whereas temporary client entity authentication uses said client public key, e) completing at the registration server entity the server procedures for said registration procedure using said registration cryptogram, whereas this step includes verification of identification data for the client entity including at least one of said data elements supplied from the client entity, f) verifying at the registration server entity said second cryptogram, and g) affixing a validity indication to said client public key at the registration server entity, contingent upon successful completion of said registration procedure and said verifying of said second cryptogram. It is a further purpose of the present invention to provide a method as before further comprising the use configuration for TLS-type data sessions with the step of h) transmitting data between the client entity and a production server entity using at least one TLS-type data session instance in which the client entity uses said private key counterpart, whereas client entity authentication uses said client public key and said validity indication.

In the design and analysis of data security protocols, a bird's eye description of protocol exchange is a convenient introduction to the specifications. However, the security analysis is best done by looking at each participant independently. Similarly, the disclosure of the present inventive method allows an independent look at the inventive method from the server side perspective and from the client side perspective.

On the server side, a registration server entity performs the client registration, and then one or more production server entities may use the client public key validity indication trustworthily established by the registration server entity. Obviously, one of the production server entities and the registration server entity may be the same entity.

Figure 3:
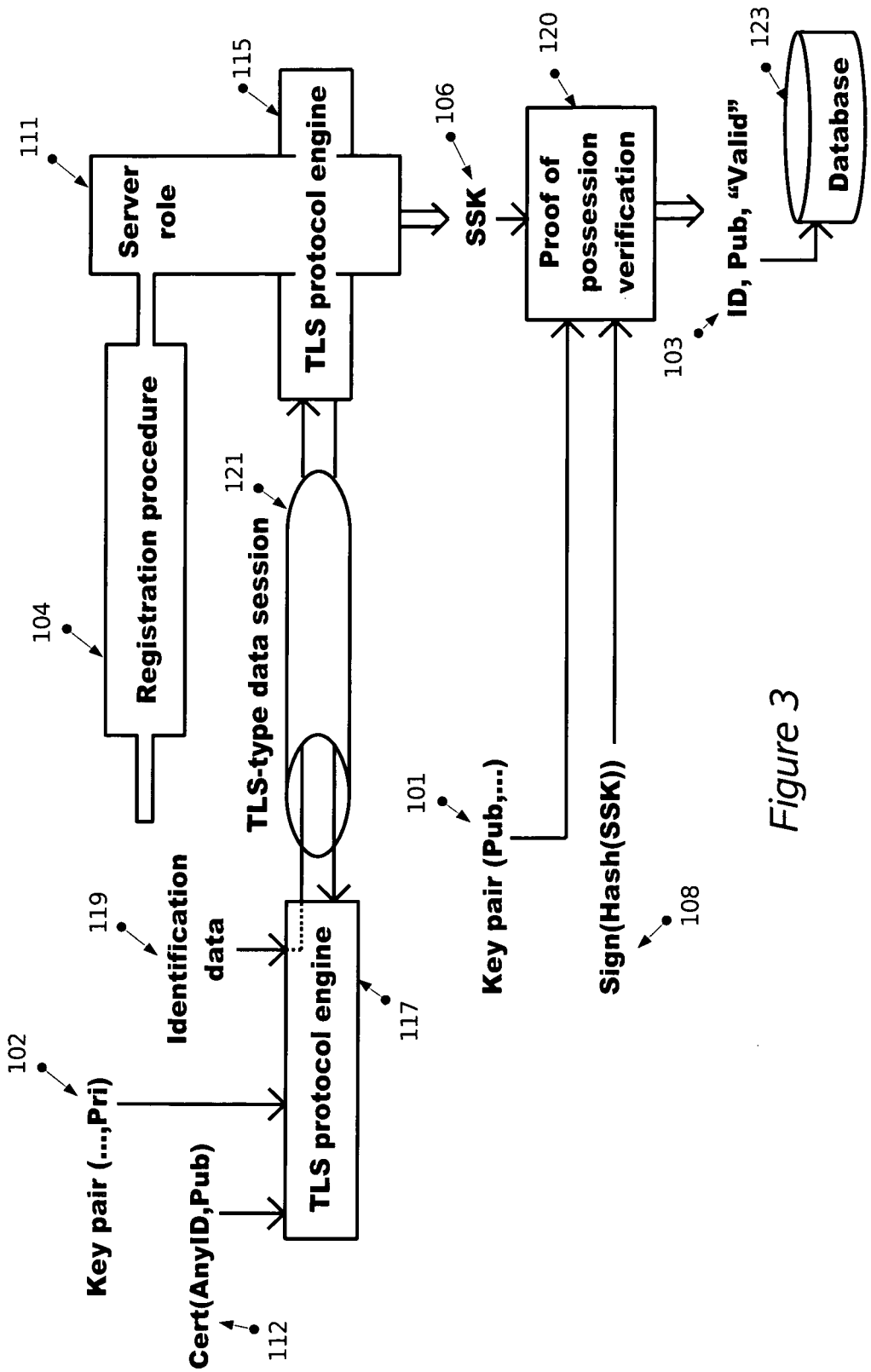

The registration server gathers assurance of what occurred at the client entity side in part through the various cryptographic verification operations, and in part indirectly through the verification of identification data for the client entity. Overall, the server perspective of the inventive method is not too distant from the bird's eye view, but the server entity has no direct knowledge of client entity data values and other details. Accordingly, the left hand portion of FIG. 3 shows elements which are inferred by the registration server entity functional blocks on the right hand side. Obviously, the client private key (102) is not known by the registration server entity and its presence in the overall scheme is inferred by the apparent magic of public key cryptography. Specifically, the inferences are the proper number-theoretic association of the private key (102) with the public key (101), the private key (102) presence in the TLS protocol engine (117), and the private key (102) use for the generation of the proof-of-possession cryptogram (108). Likewise, any production server entity infers the private key (102) presence in the TLS protocol engine (118) shown in FIG. 4.

It is thus also a purpose of the present invention to provide a method of bootstrapping configuration for TLS-type data sessions comprising steps of: a) receiving from a client entity at a registration server entity at least a.1) a client public key of said client, where said client public key has a private key counterpart, a.2) a registration cryptogram generated by the client entity according to a registration procedure to establish a symmetric secret key, and a.3) a second cryptogram that binds said client public key and said symmetric key, b) accepting identification data elements for the client entity through at least one TLS-type data session instance connected to the client entity in which the client entity uses said private key counterpart, whereas temporary client entity authentication uses said client public key, c) completing at the registration server entity the server procedures for said registration procedure using said registration cryptogram, whereas this step includes verification of identification data for the client entity including at least one of said data elements accepted from the client entity, d) verifying at the registration server entity said second cryptogram, and e) affixing a validity indication to said client public key at the registration server entity, contingent upon successful completion of said registration procedure and said verifying of said second cryptogram. It is a further purpose of the present invention to provide a method as before further comprising the use configuration for TLS-type data sessions with the step of f) transmitting data between a production server entity and the client entity using at least one TLS-type data session instance in which the client entity uses said private key counterpart, whereas client entity authentication uses said client public key and said validity indication.

On the client side, there is no direct awareness of the verifications and validations made on the server side. Mainly, the client entity is not aware of the authentication mechanisms in place at the server side. Security procedure such as the prior art X.509 client security certificate technology or the present inventive method are typically followed by client entities primarily as a requirement for access to service, and secondarily as a precaution against fraud by third parties (this should be a conscious precaution if the client entity training is effective).

There are clear cases where the client entity will be in a position to know that electronic delivery of services could not occur unless the production server entity enforces client entity authentication. This includes services that are billed on a subscription basis, transactional services in the financial services industry, public sector services where the citizen accesses sensible records (e.g. patent office records for unpublished patent applications), and access to a corporate private network from a public network access point. In these cases, and when the client entity receives instructions to do so, the client entity may use the inventive method for bootstrapping the configuration for TLS-type data sessions and using this configuration in one or more TLS-type data session instance (122) connected to a production server entity that enforces client entity authentication.

With the inventive method, the client entity is relieved of the most of the hindrance of genuine X.509 client security certificates. If need be, this is achieved with the generation of a dummy client security certificate (112), or more generally a client security certificate chain in which at least one signature uses a private key of which the signature capability is available without authentication formalities to the client entity.

From the client entity perspective, the preferred embodiment is advantageous for phising avoidance: firstly, the use of a custom software utility for the registration procedure client role (110), public key pair generation (109), proof of possession generation (107), and dummy certificate generation (113), plus the selection of a SAKEM pass reply; secondly the web session secured by the TLS-type data session instance (121) where the client entity agent may see a receipt acknowledgment of the previous registration instance prior to the entry of identification data (119), and thirdly the out-of-band contact with the introducer where the SAKEM pass reply ensures referential certainty.

It is thus also a purpose of the present invention to provide a method of bootstrapping configuration for TLS-type data sessions and using said configuration in at least one TLS-type data session instance connected to a production server entity that enforce client entity authentication, the method comprising steps of: a) procuring a client public key having a private key counterpart, b) generating a registration cryptogram according to a registration procedure to establish a symmetric secret key, and a second cryptogram that binds said client public key and said symmetric secret key, c) sending at least said client public key, said registration cryptogram, and said second cryptogram to the registration server entity, d) supplying identification data elements for the client entity through at least one TLS-type data session instance connected to the registration server entity in which the client entity uses said private key counterpart, and e) transmitting data between the client entity and a production server entity, after said sending step c) and said supplying step d) are completed, using at least one TLS-type data session instance in which the client entity uses said private key counterpart.

Many IT security techniques from which the present invention draws are available in the prior art, and for the most part readily available in common computer systems. The IT security techniques are more or less user-friendly; this is both an obstacle to their use and a source of vulnerability. The primary benefit of the present invention lies perhaps less in the strengthening of a specific IT security technique or in optimization of computer resources for a given security function than in the effectiveness of the overall security scheme, including some reduction of user misunderstanding pitfalls. This benefit is achieved by integrating security technique elements and user procedural elements in such a way that no vulnerability arises due to the decoupling of elements. The invention design is influenced by widely deployed software capabilities, notably the support of client security certificates in web browser software. It is also influenced by the very limited potential to train end-users in IT security principles, notably the almost impossible task of explaining security certificates even to expert computer users. It is paradoxical that the invention relies on the support of the very security certificates that are found user unfriendly. Some embodiments of present invention works around this paradox by using a dummy client security certificate that is openly described as a dummy.

In some aspects, some embodiments of the present invention may look like over-specified security mechanisms, with no readily identifiable fraud threat, and not only as a matter of unnecessarily large cryptographic keys. This approach is advantageous for unanticipated attack scenarios, e.g. in which a cryptographic primitive is indirectly weakened. Here are three examples of such conscious but diffuse concern about unanticipated attack scenarios, the first one taken from the field of applied cryptography outside of the present invention.

An historical example of this idea is the use of RSA signatures with the public exponent value 3 which has been successfully attacked for signature software implementation that failed to make a complete validation of the RSA computation output (using some standards-based encoding of signed data). It is a faulty software implementation that created an indirect vulnerability to RSA with public exponent 3, i.e. some detectable signature forgery attempts are undetected by some software package versions, but not the more recent ones. Besides software upgrade, another countermeasure is the use of the larger public exponent value 65537. In retrospect, that could have been considered over-specification without the conscious but diffuse concern about unanticipated attack scenarios.

In the embodiments with PEKE as the cryptosystem in the registration procedure, the use of low-exponent modular arithmetic (i.e., RSA low-exponent, Rabin-Williams variants including PEKE) is such that it can be protected from chosen-ciphertext attacks by a HSM (Hardware Security Module) implementation. Many implementation details that may make a difference in the context of unanticipated indirect attacks are disclosed in the Canadian patent application 2,271,178, Thierry Moreau, "Server-side Public Key Cryptography Apparatus with Private Key Protection and Isolation from Public Networks", published on Jul. 6, 1999.

The embodiments using SAKEM have the out-of-band identification data assertion feature plus a single-use pass reply that links the electronic registration to the out-of-band assertion channel. This allows the registration operator to distinguish securely among multiple outstanding electronic registrations. There is no readily identifiable threat scenario in such a case of multiple outstanding registrations, provided the public key cryptography in the registration procedure works as intended. Nonetheless, a conscious but diffuse concern about unanticipated attack scenarios suggests the use of the SAKEM pass reply.

With a similar concern about the ultimate security of the whole scheme, those responsible for the client entity may have an existential distrust against anything received from the network, including any custom software. However, there are important limitations in the ultimate security potential of the broadly distributed software, and thus some custom software is unavoidable for any significant improvement in Internet security. In the preferred embodiment, there is a single custom software distribution. The preferred embodiment is an optimized design, with the meaning that every special cryptographic processing is within this single software utility. Furthermore, very little, if any, end-user interaction is needed for the software utility operations, so software maintenance should be minimal. End-user interaction is deferred to the TLS-type data session instance (121) that relies on off-the-shelf web browser software and the security potential of the client entity key pair (101, 102).

A further feature addresses an existential distrust against anything a malignant and powerful third party might attempt. The registration software utility needs the registration server entity public key for the registration procedure, just like a web browser needs some trusted CA top-level security certificates (actually, the web browser needs little more than the trusted CA public keys, but the X.509 technology complexity again blurs the essential issues). So, there is a single piece of information, i.e. the server entity public key for the registration procedure, which is a trust anchor. The rollover operation for this cryptographic key may be performed according to the method disclosed in the Canadian patent application number 2,511,366, Thierry Moreau, "Trust Anchor Key Cryptogram and Cryptoperiod Management Method", published on Oct. 16, 2005. This arrangement works well when the registration software utility has network connectivity. In cases where a store-and-forward arrangement, the shelf life management for the registration software utility must be addressed by other means (unless a limited shelf life is not an issue). These subtle notions about the ultimate basis of trust in the system are no different from those occurring with the DNSSEC protocol deployment at the DNS root, except that they don't get into tangle with the political aspects of a public service like the DNS.

Although the present invention has been described with reference to a particular preferred embodiment, someone knowledgeable of the field will appreciate that various modifications and enhancements may be made without departing from the spirit and scope of the invention disclosed herein.

What is claimed is:

1. A method of bootstrapping configuration for Transport Layer Security "TLS-type" data sessions comprising steps of:
   a) procuring a client public key having a private key counterpart;
   b) generating at the client entity a registration cryptogram according to a registration procedure to establish a symmetric secret key, and a second cryptogram that binds said client public key and said symmetric secret key;
   c) sending at least said client public key, said registration cryptogram, and said second cryptogram to a registration server entity;
   d) supplying from the client entity identification data elements for the client entity through at least one TLS-type data session instance connected to the registration server entity in which the client entity uses said private key counterpart, whereas temporary client entity authentication uses said client public key;
   e) completing at the registration server entity the server procedures for said registration procedure using said registration cryptogram, whereas this step includes verification of identification data for the client entity including at least one of said data elements supplied from the client entity;
   f) verifying at the registration server entity said second cryptogram; and
   g) affixing a validity indication to said client public key at the registration server entity, contingent upon successful completion of said registration procedure and said verifying of said second cryptogram.

2. The method as in claim 1 further comprising the use configuration for TLS-type data sessions with the step of
   h) transmitting data between the client entity and a production server entity using at least one TLS-type data session instance in which the client entity uses said private key counterpart, whereas client entity authentication uses said client public key and said validity indication.

3. The method as in claim 2, where said TLS-type data session instance connected to the registration server entity and said TLS-type data session instance in the transmitting step h) use during protocol parameter negotiations a client security certificate chain in which at least one signature uses a private key of which the signature capability is available without authentication formalities to the client entity.

4. The method as in claim 3, where said client security certificate chain is generated at the client entity.

5. The method as in claim 4, where step b) and said generation of client security certificate chain are effected by means of a single software utility.

6. The method as in claim 3, where said client security certificate chain is generated by an on-line service provider.

7. The method as in claim 1, where steps a) and b) are effected by means of a single software utility.

8. The method as in claim 1, where said temporary client entity authentication using said client public key and said validity indication is effected by means of an HTTP server script procedure.

9. The method as in claim 1, where said client public key is stored in a database at the registration server entity.

10. The method as in claim 1, where said identification data for the client entity at the registration procedure completion step e) includes out-of-band assertions of identification data made by an agent of the client entity.

11. The method as in claim 1, where said verification of identification data for the client entity is operator-assisted.

12. A method of bootstrapping configuration for Transport Layer Security "TLS-type" data sessions comprising steps of:
   a) receiving from a client entity at a registration server entity at least
      a.1) a client public key of said client, where said client public key has a private key counterpart;
      a.2) a registration cryptogram generated by the client entity according to a registration procedure to establish a symmetric secret key; and
      a.3) a second cryptogram that binds said client public key and said symmetric key;
   b) accepting identification data elements for the client entity through at least one TLS-type data session instance connected to the client entity in which the client entity uses said private key counterpart, whereas temporary client entity authentication uses said client public key;
   c) completing at the registration server entity the server procedures for said registration procedure using said registration cryptogram, whereas this step includes verification of identification data for the client entity including at least one of said data elements accepted from the client entity;
   d) verifying at the registration server entity said second cryptogram; and
   e) affixing a validity indication to said client public key at the registration server entity, contingent upon successful completion of said registration procedure and said verifying of said second cryptogram.

13. The method as in claim 12 further comprising the use configuration for TLS-type data sessions with the step of
   f) transmitting data between a production server entity and the client entity using at least one TLS-type data session instance in which the client entity uses said private key counterpart, whereas client entity authentication uses said client public key and said validity indication.

14. The method as in claim 13, where said TLS-type data session instance at the registration server entity and said TLS-type data session instance at the production server entity uses during protocol parameter negotiations a client security certificate chain, the verification of which does not contribute to the client entity authentication.

15. The method as in claim 12, where said temporary client entity authentication using said client public key and said validity indication is effected by means of an HTTP server script procedure.

16. The method as in claim 12, where said client public key is stored in a database at the registration server entity.

17. The method as in claim 12, where said identification data for the client entity at the registration procedure completion step c) includes out-of-band assertions of identification data made by an agent of the client entity.

18. The method as in claim 12, where said verification of identification data for the client entity is operator-assisted.

19. A method of bootstrapping configuration for Transport Layer Security "TLS-type" data sessions and using said configuration in at least one TLS-type data session instance connected to a production server entity that enforce client entity authentication, the method comprising steps of:
   a) procuring a client public key having a private key counterpart;
   b) generating a registration cryptogram according to a registration procedure to establish a symmetric secret key, and a second cryptogram that binds said client public key and said symmetric secret key;
   c) sending at least said client public key, said registration cryptogram, and said second cryptogram to a registration server entity;
   d) supplying identification data elements for the client entity through at least one TLS-type data session instance connected to the registration server entity in which the client entity uses said private key counterpart; and
   e) transmitting data between the client entity and a production server entity, after said sending step c) and said supplying step d) are completed, using at least one TLS-type data session instance in which the client entity uses said private key counterpart.

20. The method as in claim 19, where said TLS-type data session instance connected to the registration server entity and said TLS-type data session instance connected to the production server entity use during protocol parameter negotiations a client security certificate chain in which at least one signature uses a private key of which the signature capability is available without authentication formalities to the client entity.

21. The method as in claim 20, where said client security certificate chain is generated at the client entity.

22. The method as in claim 21, where step b) and said generation of client security certificate chain are effected by means of a single software utility.

23. The method as in claim 20, where said client security certificate chain is generated by an on-line service provider.

24. The method as in claim 19, where steps a) and b) are effected by means of a single software utility.

25. The method as in claim 19, where said transmitting step e) is preceded by out-of-band assertions of identification data made by an agent of the client entity.

* * * * *